(12) United States Patent
Nakamura

(10) Patent No.: US 7,844,935 B2
(45) Date of Patent: Nov. 30, 2010

(54) WIRING DESIGN SYSTEM OF SEMICONDUCTOR INTEGRATED CIRCUIT, SEMICONDUCTOR INTEGRATED CIRCUIT, AND WIRING DESIGN PROGRAM

(75) Inventor: Yuuichi Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 816 days.

(21) Appl. No.: 11/791,063

(22) PCT Filed: Nov. 18, 2005

(86) PCT No.: PCT/JP2005/021619

§ 371 (c)(1),
(2), (4) Date: May 18, 2007

(87) PCT Pub. No.: WO2006/054786

PCT Pub. Date: May 26, 2006

(65) Prior Publication Data

US 2008/0141207 A1    Jun. 12, 2008

(30) Foreign Application Priority Data

Nov. 19, 2004    (JP)    ............................. 2004-335629

(51) Int. Cl.
*G06F 17/50*    (2006.01)
*H03K 19/003*    (2006.01)
*H01L 25/00*    (2006.01)

(52) U.S. Cl. ............................. 716/13; 716/14; 716/10; 716/6; 326/31; 326/41; 326/47; 326/101

(58) Field of Classification Search .................... 716/6, 716/10, 13, 14; 326/31, 41, 47, 101
See application file for complete search history.

(56) References Cited

U.S. PATENT DOCUMENTS 6,150,865 A * 11/2000 Fluxman et al. ............. 327/292

FOREIGN PATENT DOCUMENTS

| JP | 10-229130 | 8/1998 |
|---|---|---|
| JP | 2000-021992 | 1/2000 |
| JP | 2001-044289 | 2/2001 |
| JP | 2002-043550 | 2/2002 |
| JP | 2003-092352 | 3/2003 |
| JP | 2003-109382 | 4/2003 |
| JP | 2003-282712 | 10/2003 |

* cited by examiner

*Primary Examiner*—Phallaka Kik
(74) *Attorney, Agent, or Firm*—Scully, Scott, Murphy & Presser, P.C.

(57) ABSTRACT

A wiring design system for semiconductor integrated circuit which realizes a low power consumption in a grid-shaped clock wiring within a semiconductor integrated circuit is provided. A wiring design system 10 for semiconductor integrated circuit which designs the gird-shaped clock wiring for uniformly distributing the clock signals to the flip flop circuits arranged within the semiconductor integrated circuit, wherein, of the clock wiring lines forming the grid-shaped clock wiring, a clock wiring line having a smaller effect on the distribution operation of the clock signals in the grid-shaped clock wiring is selected and thinned out as a less necessary clock wiring line.

30 Claims, 12 Drawing Sheets

WIRING DESIGN SYSTEM OF SEMICONDUCTOR INTEGRATED CIRCUIT, SEMICONDUCTOR INTEGRATED CIRCUIT, AND WIRING DESIGN PROGRAM

INCORPORATION BY REFERENCE

This application is based upon and claims the benefit of priority from Japanese patent application No. 2004-335629, filed on Nov. 19, 2004, the disclosure of which is incorporated herein in its entirety by reference.

FIELD OF THE INVENTION

The present invention relates to a wiring design system for semiconductor integrated circuit, and more particularly, to a wiring design system for semiconductor integrated circuit, a semiconductor integrated circuit, and a wiring design program which realize a low power consumption in a grid-shaped clock wiring.

DESCRIPTION OF THE RELATED ART

The clock wiring of a semiconductor integrated circuit of related art is formed by the grid-shaped clock wiring in which clock wiring lines are uniformly arranged in a grid pattern.

FIG. 12 is a view showing an example of a clock wiring line 50 of a semiconductor integrated circuit 40 according to the related art technique.

The clock wiring line 50 in a uniform grid pattern has the following characteristics. Namely, time difference among the clock signals which arrive at the respective flip flop circuits becomes less because the clock wiring lines are uniformly arranged in a grid pattern. A difference between the first clock signal arriving at a flip flop circuit at first and the last clock signal arriving at another flip flop circuit at last is called a clock skew.

When the clock skew is large, a restriction to the data signal propagation becomes large as described below.

FIG. 13 is a view for describing the effect of the clock skew on the data signal propagation.

Referring to FIG. 13, there are two flip flop circuits (FF), FF 521 and FF 522 and clock signals are supplied there. Time of the data signal propagation between the both is designed to be ten times as long as a clock cycle.

In the chart of FIG. 13, in the case of example 1, the arrival time of a clock signal to each of the FF 521 and the FF 522 is shown as +2 by the clock cycle and there is no clock skew. In this case, the data signal propagation time is shown as 10 by the clock cycle and there occurs no problem.

In the example 2, however, when the clock arrival time to the FF 521 is +3 and the clock arrival time to the FF 522 is +2, data signal has to travel in a shorter propagation time 9; otherwise the circuit would malfunction.

On the contrary, when the clock arrival time of the flip flop FF 521 is +1 and the clock arrival time of the flip flop FF 522 is +3, the data signal has to travel in a longer propagation time 12; otherwise the circuit would malfunction.

In order to prevent this problem, it is necessary to supply a clock to every flip flop circuit uniformly.

Since the grid-shaped clock wiring for distributing the clocks to the semiconductor integrated circuit 40 is formed in a uniform grid shape in order to reduce the clock skew, there is a problem that some redundant line may occur in the grid.

Even in the redundant line, signals travel in the same way as in the other lines, which increases the power consumption generally in the grid-shaped clock wiring. Increase in the power consumption disturbs miniaturization and speeding up the circuit or restricts the operational environment.

In the grid-shaped clock wiring for distributing the clock uniformly, the intervals in the grid becomes an important matter. It is because, when the spaces between grids are narrow, the uniformity of the clock distribution increases, but the number of the redundant lines increases and accordingly the power consumption increases. While, when the spaces between grids are wide, the number of the redundant lines decreases, but the uniformity of the clock distribution is deteriorated. Since an effective means for determining the intervals in the grid is not established, it is difficult to determine the intervals in the grid.

An example of a method for solving the problem is described, for example, in Japanese Patent Publication Laid-Open No. 2003-282712 (Patent Document 1) and No. 2002-43550 (Patent Document 2).

A method disclosed in Patent Document 1 provides a clock wiring method for creating a grid-shaped clock wiring corresponding to a hierarchical structure of a semiconductor chip layout while preserving the hierarchical structure of the semiconductor chip. In the method, clocks are distributed so that the clock skew from an external clock input terminal to a flip flop circuit forming every circuit block may be minimum and the clock signal is supplied to every flip flop circuit forming the circuit block.

According to the method of Patent Document 1, because of processing with the hierarchical structure of the layout kept, the amount of processing in a calculator can be much more reduced compared with the related art method of expanding the layout hierarchy and then processing.

A method disclosed in Patent Document 2 relates to a method for reducing a clock skew in a semiconductor integrated circuit, in which the number of stages of transistors in each clock driver circuit is properly arranged according to the density of the cells using the clock signals in the vicinity of a plurality of clock driver circuits of supplying a proper clock signal to a cell using a clock signal, through the grid-shaped clock wiring in a core region of the semiconductor integrated circuit.

According to the method of Patent Document 2, it is possible to reduce a clock skew for one layer easily without rearrangement of the cells in the core region other than the clock driver circuit.

The methods of related art described above have the following problems.

According to the method of Patent Document 1, while the hierarchical structure of a semiconductor chip layout is preserved, clocks are distributed so that the clock skew from the external clock input terminal to the flip flop circuit forming every circuit may be minimum, thereby reducing the processing amount of a calculator extremely compared with the related art method of expanding the layout hierarchy and then processing.

The method of Patent Document 1, however, assumes that the structure of the grid-shaped clock wiring is not changed and it does not solve the defect of the grid-shaped clock wiring, that is the large power consumption.

According to the method of Patent Document 2, the number of the stages of the transistors in each clock driver circuit is properly arranged according to the density of the cells using the clock signals in the vicinity of a plurality of the clock driver circuits of supplying a proper clock signal to the cell using the clock signal, thereby further reducing a clock skew easily without rearrangement of the cells in the core region other than the clock driver circuit.

The method of Patent Document 2, however, also assumes that the structure of the grid-shaped clock wiring is not changed and it does not solve the defect of the grid-shaped wiring, that is the large power consumption.

SUMMARY OF THE INVENTION

An exemplary object of the invention is to provide a wiring design system for semiconductor integrated circuit, a semiconductor integrated circuit, and a wiring design program which solve the above defect of the related art technique and realize a low power consumption in the grid-shaped clock wiring.

According to an exemplary aspect of the invention, a wiring design system for semiconductor integrated circuit, which designs a grid-shaped clock wiring for uniformly distributing clock signals to flip flop circuits arranged within the semiconductor integrated circuit, wherein a clock wiring line having a smaller effect on distribution operation of the clock signals in the grid-shaped clock wiring is selected from clock wiring lines forming the grid-shaped clock wiring as a less necessary clock wiring line and thinned out.

According to another exemplary aspect of the invention, the less necessary clock wiring line is selected based on, at least one of the number of the flip flop circuits supplying the clock signals through the clock wiring lines, the number of the flip flop circuits arranged in each grid forming the grid-shaped clock wiring, and the disposition of the flip flop circuits within the semiconductor integrated circuit.

Clock wiring lines regarded as less necessary are classified into four as follows:
1. After calculating the number of the flip flop circuits supplying the clock signals for every clock wiring line, a clock wiring line having a small number of the flip flop circuits supplying the clock signals, the number of the clock wiring lines corresponding to a fraction of the total number of the clock wiring lines.
2. After dividing the grid-shaped clock wiring by the length of the grid in a vertical direction and a horizontal direction and calculating the number of the flip flop circuits supplying the clock signals for every clock wiring line divided by the length of the grid, a clock wiring line having the small number of the flip flop circuits supplying the clock signals, the number of the clock wiring lines corresponding to a fraction of the total number of the clock wiring lines divided by the length of the grid.
3. After calculating the number of the flip flop circuits within each grid forming the grid-shaped clock wiring, a clock wiring line on a boundary between the grid in which the number of the flip flop circuits is a predetermined number or less and the grid having the smallest number of the flip flop circuits within the grid, of the grids adjacent to the above grid.
4. One for every two clock wiring lines in the grid-shaped clock wiring when the disposition of the flip flop circuits is uniform.

As mentioned above, by thinning out the less necessary clock wiring line, the power consumption in the grid-shaped clock wiring can be reduced.

In order to prevent increase in a clock skew caused by thinning out, the invention rearranges the flip flop circuit which becomes far from the clock wiring line receiving the clock signal, in the vicinity of the clock wiring line.

Because of the rearrangement, the clock skew can be reduced to the same degree as that before thinning out of the clock wiring line.

As mentioned above, by rearranging the flip flop circuit after thinning out the less necessary clock wiring line, the power consumption in the clock wiring can be reduced while keeping the clock skew small.

In the invention, a dummy line is inserted in a portion in which a line is eliminated through thinning out. In the dummy line, signal does not travel, but since the line is the same as the clock wiring line completely, the distribution of the line capacity within the semiconductor integrated circuit according to the grid-shaped clock wiring can be uniformly kept in the same way as that before thinning out of the clock wiring line.

DESCRIPTION OF PREFERRED EXEMPLARY EMBODIMENT

First Exemplary Embodiment

Figure 1:
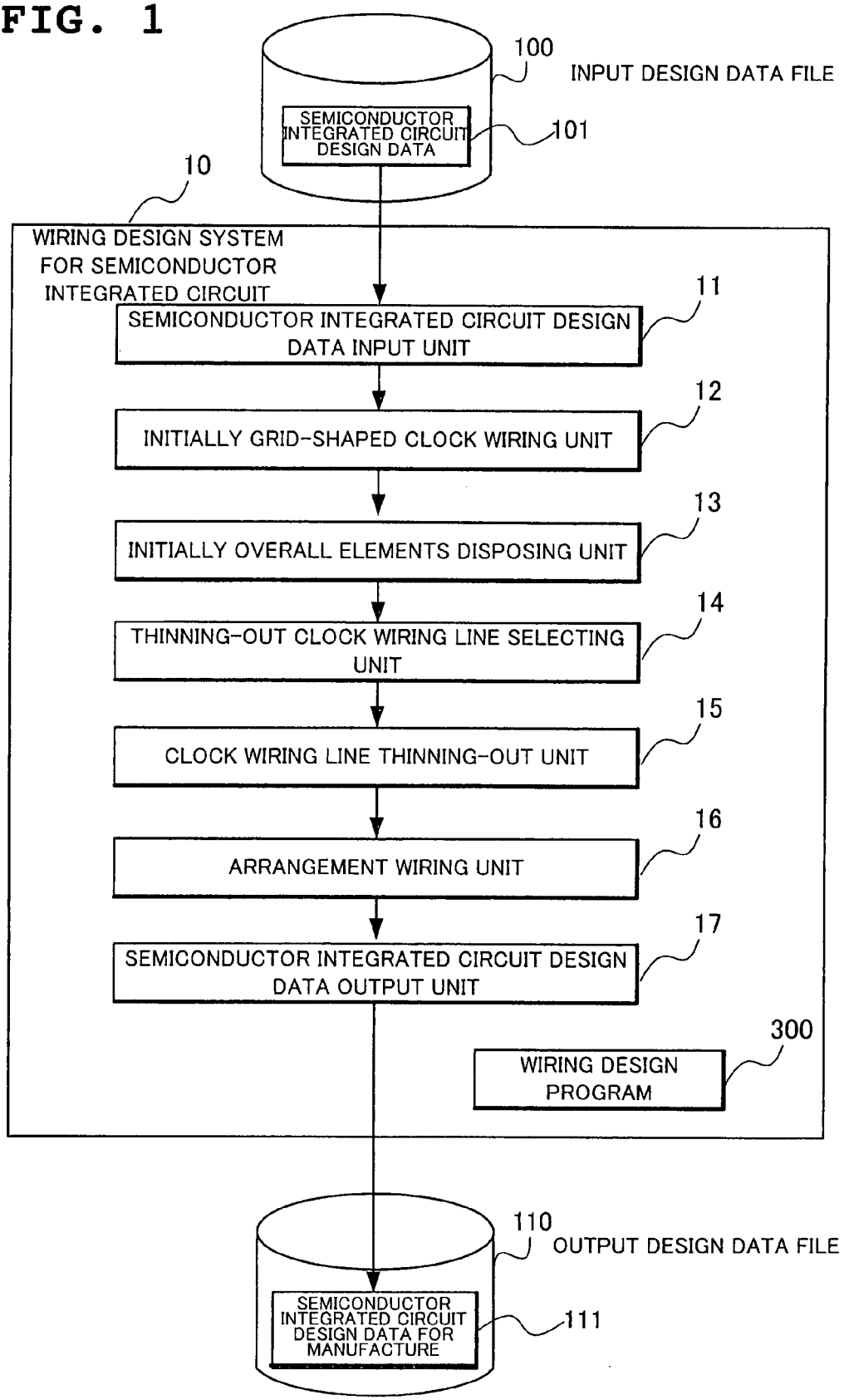
FIG. 1 is a block diagram showing a structure of a wiring design system for semiconductor integrated circuit according to a first exemplary embodiment of the invention.

Hereinafter, exemplary embodiments of the invention will be described in detail referring to the drawings.

FIG. 1 is a block diagram showing a structure of a wiring design system 10 for semiconductor integrated circuit according to a first exemplary embodiment.

Referring to FIG. 1, a wiring design system 10 for semiconductor integrated circuit according to the first exemplary embodiment includes a semiconductor integrated circuit design data input unit 11, an initially grid-shaped clock wiring unit 12, an initially overall elements disposing unit 13, a thinning-out clock wiring line selecting unit 14, a clock wiring line thinning-out unit 15, an arrangement wiring unit 16, and a semiconductor integrated circuit design data output unit 17.

These units respectively operate as follows.

The semiconductor integrated circuit design data input unit 11 inputs semiconductor integrated circuit design data 101 within an input design data file 100.

The initially grid-shaped clock wiring unit 12 can set a uniform grid-shaped clock wiring initially on the whole semiconductor integrated circuit. The initial condition of the clock wiring may be obtained by generating uniform grid-shaped clock wiring lines on the semiconductor integrated circuit.

The initially overall elements disposing unit 13 can arrange all the elements on the semiconductor integrated circuit so that they can keep a specified condition.

The thinning-out clock wiring line selecting unit 14 can select a line to be eliminated through thinning out, from the grid-shaped clock wiring (hereinafter, elimination through thinning out is abbreviated as thinning-out elimination) based on the condition of the grid-shaped clock wiring uniformly generated on the whole semiconductor integrated circuit and all the arranged elements, and output the target line for thinning-out elimination.

The clock wiring line thinning-out unit 15 can actually thin out and eliminate the target clock wiring line for thinning-out elimination which is output by the thinning-out clock wiring line selecting unit 14, from the design data of the semiconductor integrated device.

The arrangement wiring unit 16 can determine the disposition of all the elements and the wiring after determination of the clock wiring lines.

The semiconductor integrated circuit design data output unit 17 supplies semiconductor integrated circuit design data 111 for manufacture with the clock wiring generated by the above unit and the position of the flip flop circuit modified, to the output design data file 110.

A function for selecting a less necessary clock wiring line by the thinning-out clock wiring line selecting unit 14 and thinning out/eliminating the line by the clock wiring line thinning-out unit 15, which is the characteristic of the invention, may be realized by mounting a circuit component including a program for realizing such a function in a computer. Alternatively, a program (application) for realizing the characteristic function of the invention may be stored in a storing medium and the program may be executed by a computer, thereby making the computer work as the wiring design system 10 for semiconductor integrated circuit.

Next, an operation of the wiring design system 10 for semiconductor integrated circuit will be described.

Figure 2:
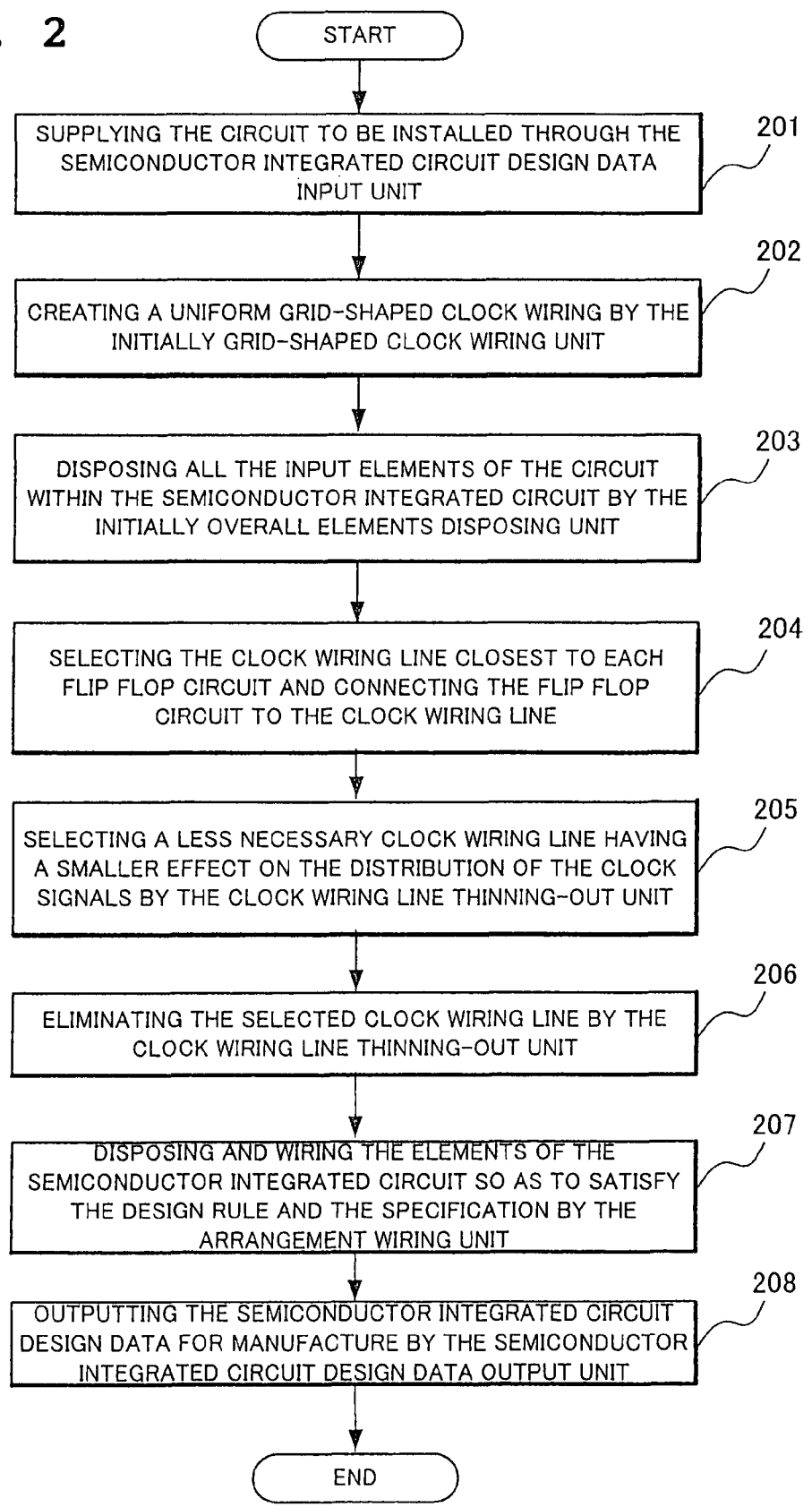
FIG. 2 is a flow chart for describing an operation of the wiring design system for semiconductor integrated circuit according to the first exemplary embodiment of the invention.

FIG. 2 is a flow chart for describing the operation of the wiring design system 10 for semiconductor integrated circuit according to this exemplary embodiment.

Referring to FIG. 2, at first, the semiconductor integrated circuit design data 101 that is the circuit data to be installed is supplied through the semiconductor integrated circuit design data input unit 11 (Step 201).

In order to set the initial condition of the clock wiring, the initially grid-shaped clock wiring unit 12 generates the uniform grid-shaped clock wiring lines (Step 202).

Similarly to the ordinal semiconductor integrated circuit design, the initially overall elements disposing unit 13 disposes all the elements of the circuit supplied through the semiconductor integrated circuit design data input unit 11 within the semiconductor integrated circuit (Step 203).

The initially grid-shaped clock wiring unit 12 selects a clock wiring line which is nearest to each flip flop circuit and connects the flip flop circuit to the grid-shaped clock wiring as for all flip flop circuits disposed in the semiconductor integrated circuit (Step 204).

In the case of completing the process at this stage by the initially grid-shaped clock wiring unit 12, it is the same as the design using the conventional uniform grid-shaped clock wiring, and the semiconductor integrated circuit to be obtained is also the same as that of the conventional one.

In the invention, however, the wiring by the initially grid-shaped clock wiring unit 12 is regarded as tentative, and a less necessary clock wiring line, having a smaller effect on the distribution of the clock signal in the grid-shaped clock wiring, is selected by using the thinning-out clock wiring line selecting unit 14 (Step 205).

The clock wiring line thinning-out unit 15 eliminates the clock wiring line selected in this way (Step 206).

At this stage, some lines are thinned out and eliminated from the uniform clock wiring generated by the initially grid-shaped clock wiring unit 12.

The arrangement wiring unit 16 disposes and wires the elements of the semiconductor integrated circuit so that they may satisfy the design rule and the specification (Step 207).

At last, the semiconductor integrated circuit design data output unit 17 outputs the semiconductor integrated circuit design data 102 for manufacture (Step 208).

Next, the operation according to the first exemplary embodiment will be described in detail by using a concrete example. Hereinafter, the important portions of FIG. 1 and FIG. 12 are referred to depending on necessity.

Figure 12:
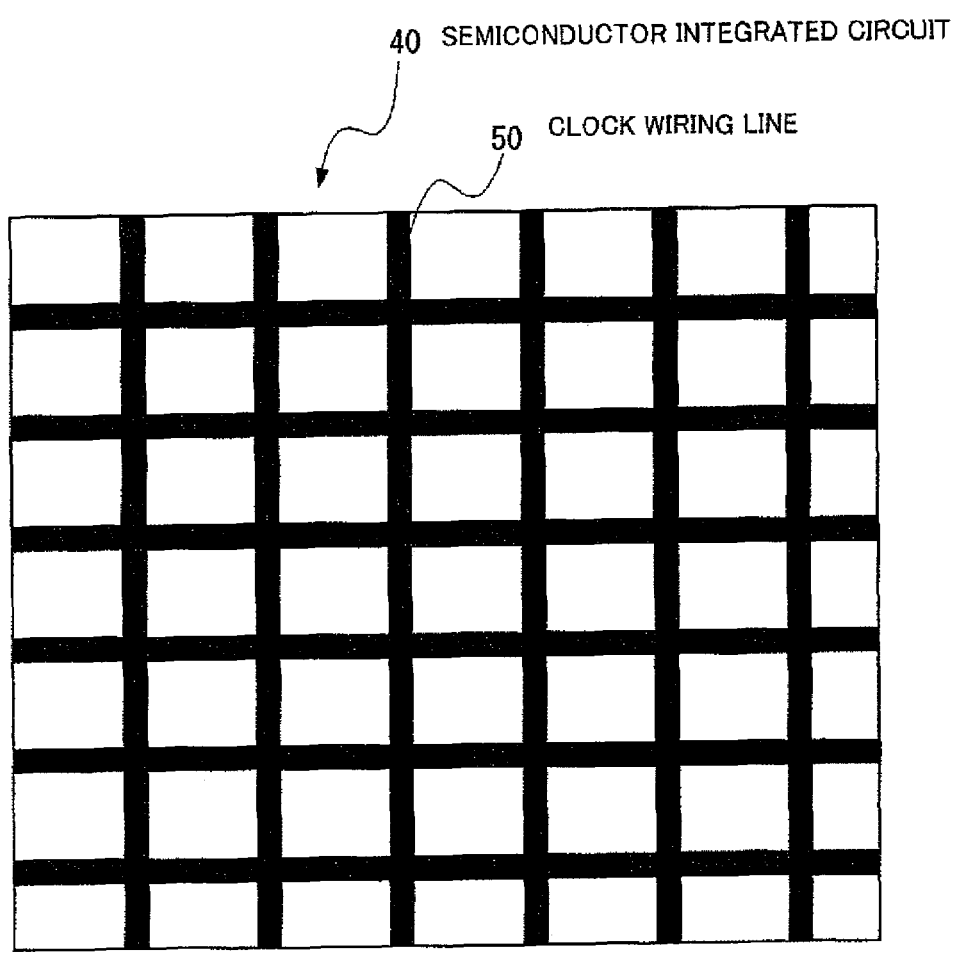
FIG. 12 is a view showing an example of a clock wiring for semiconductor integrated circuit according to the related art technique.
Figure 13:
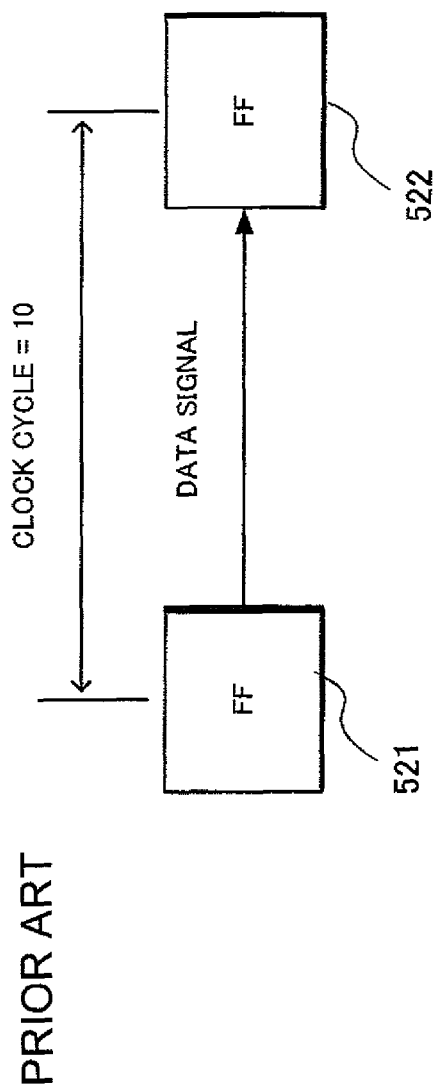
FIG. 13 is a view for describing an effect of a clock skew on data signal propagation.

As described in FIG. 12 in the Background Art, in order to uniformize the arrival time of each clock to a plurality of flip flop circuits, clock wiring lines 50 are formed uniformly in the grid-shaped clock wiring.

In the exemplary embodiment, the semiconductor integrated circuit design data 101 before clock design is supplied through the semiconductor integrated circuit design data input unit 11 and the grid-shaped clock wiring line 50 as shown in FIG. 12 is generated by the initially grid-shaped clock wiring unit 12. When the grid-shaped clock wiring is generated, it is important to determine the intervals of the lines, and in the case of the invention, since a redundant grid-shaped clock wiring line is thinned out and eliminated later, a very closer interval available for use in the clock wiring line 50 may be set in advance.

Similarly to the ordinal semiconductor integrated circuit design, the initially overall elements disposing unit 13 disposes all the elements of the circuit supplied through the semiconductor integrated circuit design data input unit 11, within the semiconductor integrated circuit 40. The processing may use any conventional arrangement method.

Considering the position relation between the flip flop circuit and the clock wiring line 50 generated by the initially grid-shaped clock wiring unit 12, the thinning-out clock wiring line selecting unit 14 selects which clock wiring line 50 of the grid-shaped clock wiring is thinned out.

Next, an example of thinning out of the clock wiring line 50 by the thinning-out clock wiring line selecting unit 14 will be described.

Figure 3:
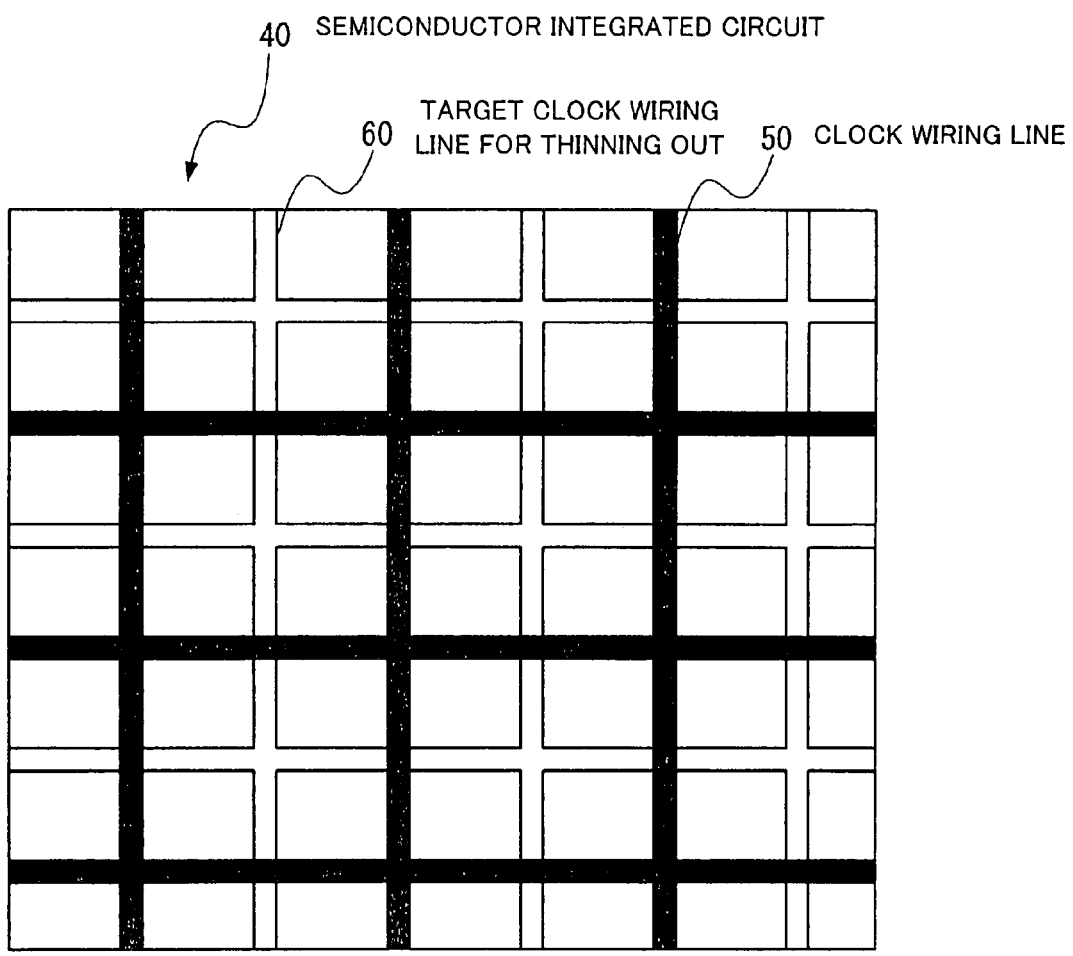
FIG. 3 is a view showing an example of thinning out clock wiring lines uniformly according to the first exemplary embodiment of the invention.

FIG. 3 is a view showing an example of thinning out the clock wiring lines 50 uniformly according to the exemplary embodiment.

Referring to FIG. 3, in a semiconductor integrated circuit 40 according to the exemplary embodiment, which is designed by using the wiring design system 10 for semiconductor integrated circuit, one for every two clock wiring lines 50 becomes a target clock wiring line 60 for thinning out.

Thinning out one for every two clock wiring lines 50 as mentioned above means that the even numbers of the clock wiring lines 50 from the clock wiring line 50 positioned in the periphery of the grid-shaped clock wiring (not shown), are thinned out and eliminated from the grid-shaped clock wiring consisting of two clock wiring lines 50 crossing each other.

In order to maintain a function of the clock wiring line 50 which is not thinned out nor eliminated, a portion of the clock wiring lines 50 which is not thinned out nor eliminated and crosses the target clock wiring line 60 for thinning out is not thinned out and left as shown in FIG. 3. However, when the function of the clock wiring line 50 is not damaged, it is not limited to this.

Thinning out as shown in FIG. 3 is performed when the flip flop circuits are distributed uniformly. Thinning out is performed by the clock wiring line thinning-out unit 15.

Figure 4:
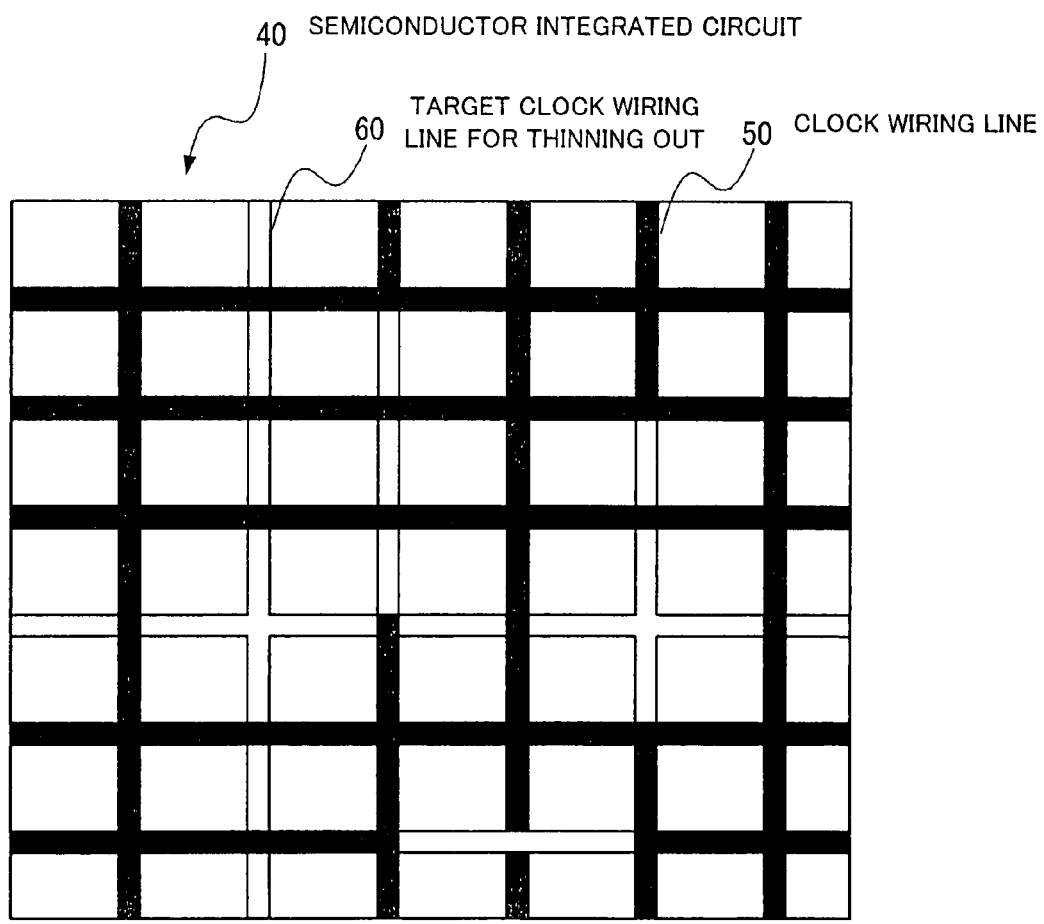
FIG. 4 is a view showing an example of thinning out the clock wiring lines nonuniformly according to the first exemplary embodiment of the invention.

FIG. 4 is a view showing an example of thinning out the clock wiring lines 50 nonuniformly according to the exemplary embodiment.

Referring to FIG. 4, in the semiconductor integrated circuit 40 according to the exemplary embodiment, which is designed by using the wiring design system 10 for semiconductor integrated circuit, the target clock wiring lines 60 for thinning out are distributed nonuniformly.

When the distribution of the clock wiring lines selected by the thinning-out clock wiring line selecting unit 14 is not uniform, the distribution of the target clock wiring lines 60 for thinning out is nonuniform.

In order to maintain the function of the clock wiring line 50 which is not thinned out nor eliminated, the portion of the clock wiring line 50 which is not thinned out nor eliminated crossing the target clock wiring line 60 is not eliminated and left as shown in FIG. 4. However, when the function of the clock wiring line 50 is not damaged, it is not limited to this.

Hereinafter, an example of selecting a target clock wiring line for thinning out by using the thinning-out clock wiring line selecting unit 14 will be described.

Figure 5:
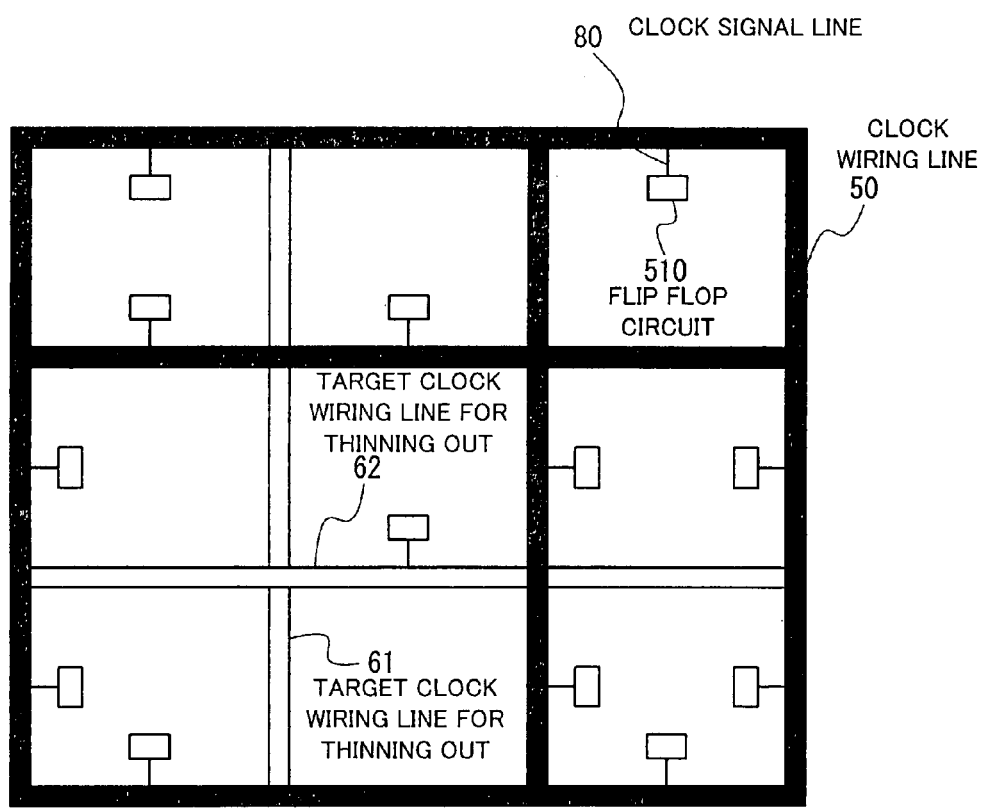
FIG. 5 is a view showing an example of selecting a target clock wiring line for thinning out according to the first exemplary embodiment of the invention.

FIG. 5 is a view showing the example of selecting the target clock wiring lines 61 and 62 according to the exemplary embodiment.

In the selection example, based on the number of the flip flop circuits 510 supplying clock signals through the clock wiring lines 50, the clock wiring lines 50 are sequentially selected in the order of increasing the number of the flip flop circuits from the clock wiring line 50 having the smallest number, and as the result, the number of the clock wiring lines 50 corresponding to a fraction of all the clock wiring lines are thinned out.

A ratio of the target clock wiring lines for thinning out to all the clock wiring lines may be set according to the situation, but this example will be described assuming that about a quarter of the clock wiring lines 50 are thinned out.

Referring to FIG. 5, each of the clock wiring lines 50 excluding the target clock wiring lines 61 and 62 for thinning out supplies the clock signal to two flip flop circuits 510. While it is found that the target clock wiring line 61 for thinning out has no flip flop circuit 510 supplying the clock signal and that the target clock wiring line 62 has one flip flop circuit 510. In this case, of a total of eight clock wiring lines 50, the two target clock wiring lines 61 and 62 for thinning out having the small number of the flip flop circuits 510 supplying the clock signal, corresponding to a quarter of all the clock wiring lines, are thinned out.

Though the above example is in the case where the clock wiring line 50 is thinned out by the number of lines, the grid-shaped clock wiring may be divided by the length of the grid. Here, it is assumed that the length of the grid is different between the vertical line and the horizontal line. When the both have the same length, it can be adopted similarly to a square grid-shaped clock wiring.

In this case, the clock wiring lines 50 forming the grid-shaped clock wiring is divided by the length of the grid, the number of the flip flop circuits supplying the clock signals is calculated in every clock wiring line 50, the clock wiring lines 50 are selected in the increasing order of the number of the flip flop circuits, and the number of the clock wiring lines 50 corresponding to a fraction of all clock wiring lines 50 are thinned out.

Next, another selection example will be described.

In this example, the number of the flip flop circuits 510 arranged in the grid is calculated for every grid generated in the grid-shaped clock wiring, and the clock wiring line 50 positioned on the boundary between the grid in which the number of the flip flop circuits 510 is a predetermined number and less and the grid having the smallest number of the flip flop circuits 510, of the grids adjacent to the above grid, is thinned out.

Figure 6:
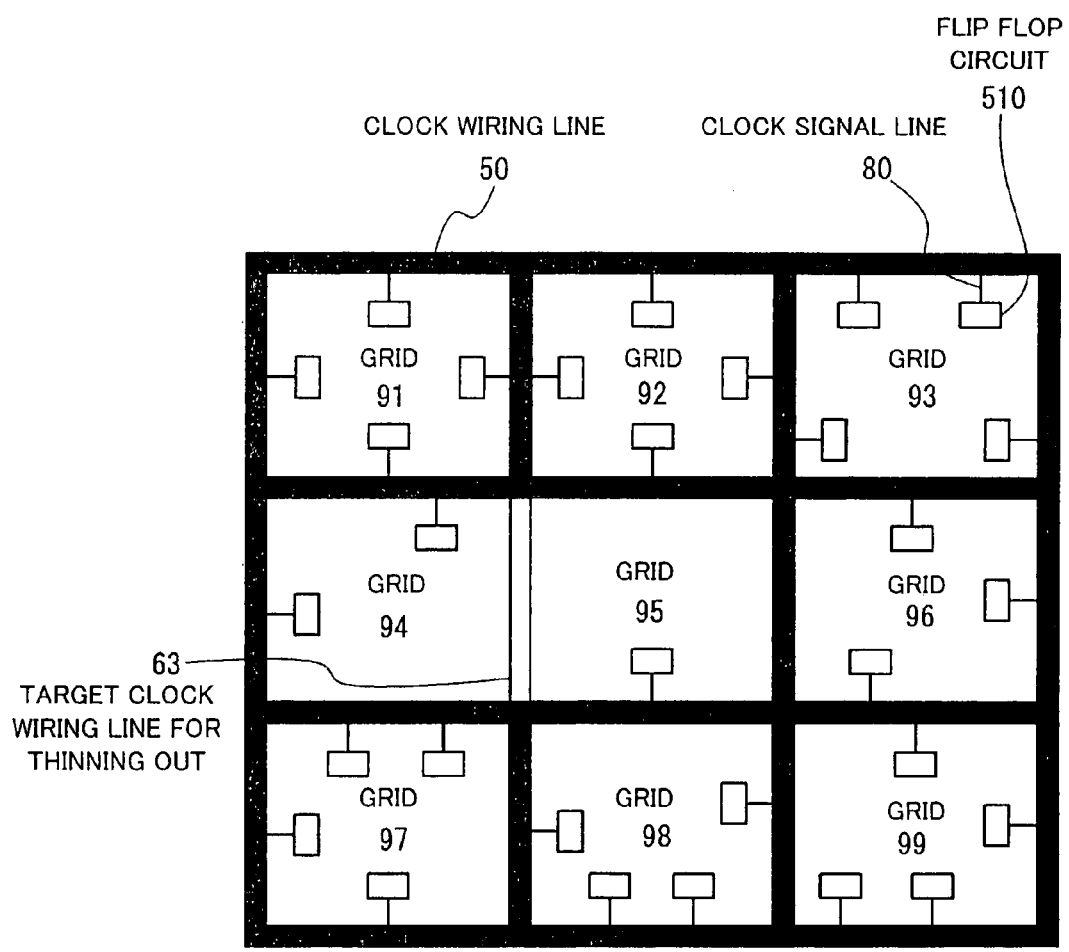
FIG. 6 is a view showing another example of selecting the target clock wiring line for thinning out according to the first exemplary embodiment of the invention.

FIG. 6 is a view for describing an example of selecting a target clock wiring line 63 for thinning out according to the exemplary embodiment.

Referring to FIG. 6, there are nine grids 91, 92, 93, 94, 95, 96, 97, 98, and 99: each of the grids 91, 92, 93, 97, 98, and 99 has four flip flop circuits 510 and the grid 95 has one flip flop circuit 510, the smallest number of the flip flop circuits 510.

When the predetermined number is set as one, it is the grid 95 that satisfies this condition. There are the four grids 92, 94, 96, and 98 that are adjacent to the grid 95 and the number of the flip flop circuits 510 arranged in each grid is four, two, three, and four respectively. The number of the flip flop circuits 510 in the grid 94 is the smallest. Therefore, the target clock wiring line 63 for thinning out positioned on the boundary between the grid 95 and the grid 94 is thinned out.

As mentioned above, the wiring design system 10 for semiconductor integrated circuit according to the exemplary embodiment is a system for designing the grid-shaped clock wiring in which the clock signals are uniformly distributed to the flip flop circuits 510 arranged in the semiconductor integrated circuit 40, in which the clock wiring line 50 having a smaller effect on distribution of the clock signals is selected regarded as less necessary and thinned out, from the grid-shaped clock wiring formed by the clock wiring lines 50.

The less necessary clock wiring line is selected based on, at least one of the number of the flip flop circuits supplying the clock signals through the clock wiring lines 50, the number of the flip flop circuits arranged in each grid forming the grid-shaped clock wiring, and the disposition of the flip flop circuits in the semiconductor integrated circuit 40.

Next, a connection to the other clock wiring line 50 by the flip flop circuit which cannot receive the clock signal as the result of thinning out will be described.

Figure 7:
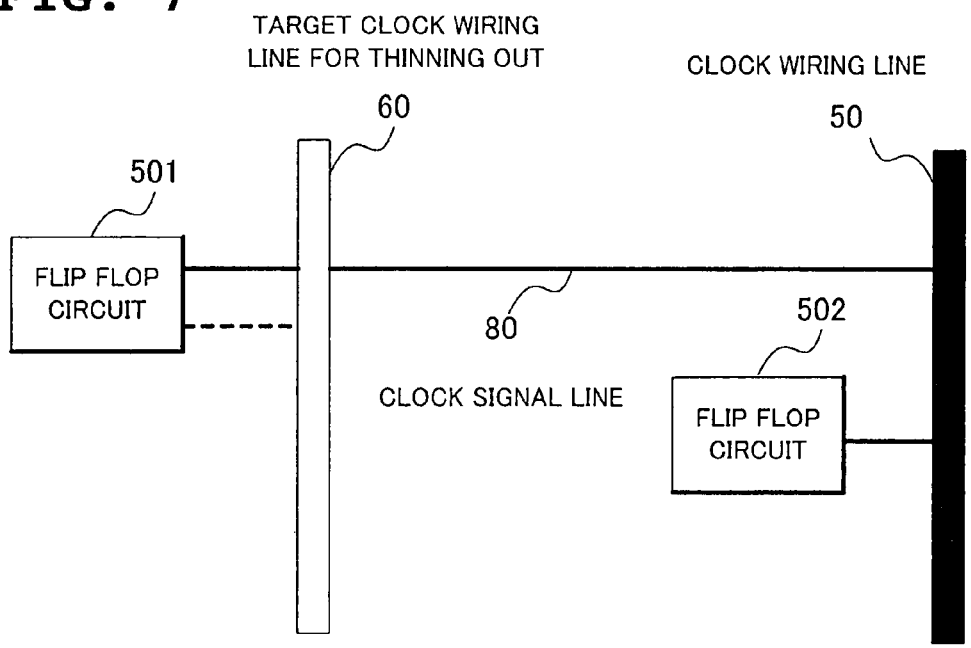
FIG. 7 is a view for describing a connection to another clock wiring line, by the flip flop circuit connected to the target clock wiring line for thinning out according to the first exemplary embodiment of the invention.

FIG. 7 is a view for describing the connection to the other clock wiring line 50 by the flip flop circuit 501 connected to the target clock wiring line 60 for thinning out, according to the exemplary embodiment.

Referring to FIG. 7, the flip flop circuit 501 which has been connected to the target clock wiring line 60 for thinning out is connected to the clock wiring line 50 which is not thinned out, through a clock signal line 80. In a flip flop circuit 502 connected near the clock wiring line 50 which is not thinned out, there is no modification of the connection.

Since the length of the clock signal line 80 from the flip flop circuit 501 which is cut off the supply of the clock signal as the result of thinning out to the clock wiring line 50 becomes longer, the clock skew increases.

Thus, the design data necessary for semiconductor manufacture can be obtained, and the semiconductor integrated circuit design data 111 for manufacture may be output by the semiconductor integrated circuit design data output unit 17.

According to the above mentioned exemplary embodiment, the electric power consumption in the grid-shaped clock wiring of the semiconductor integrated circuit 40 can be reduced.

That is because the less necessary clock wiring line is thinned out and eliminated from the grid-shaped clock wiring, hence to decrease the number of the lines.

Further, it becomes unnecessary to determine the intervals in the grid-shaped clock wiring precisely through calculation in advance.

That is because the less necessary clock wiring line is thinned out after the grid-shaped clock wiring is generated by the clock wiring lines 50 arranged at close intervals.

Second Exemplary Embodiment

Next, a second exemplary embodiment of the invention will be described referring to the drawings.

Figure 8:
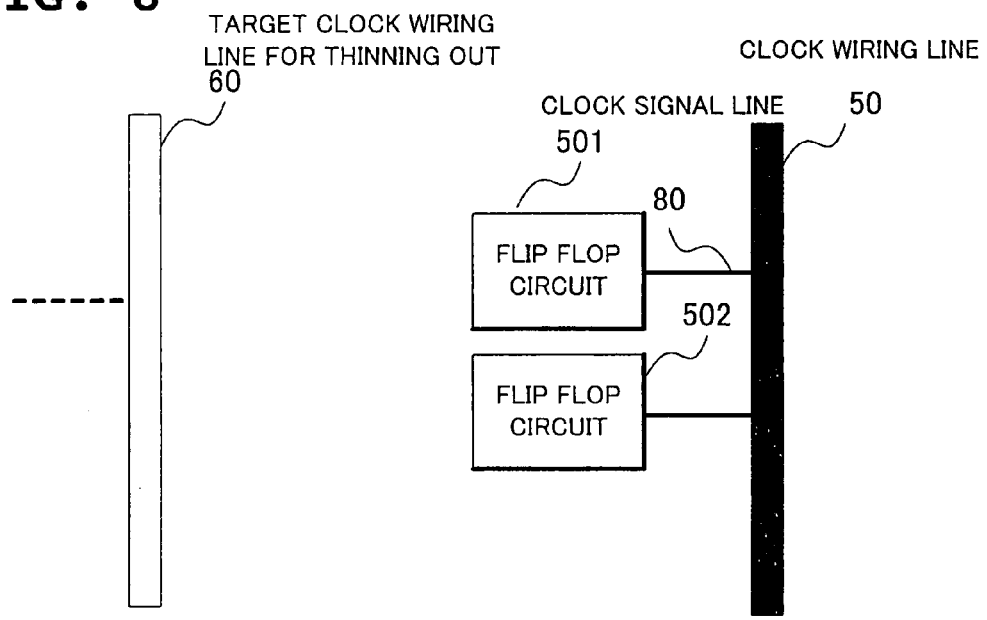
FIG. 8 is a block diagram showing a structure of a wiring design system for semiconductor integrated circuit according to a second exemplary embodiment of the invention.
Figure 9:
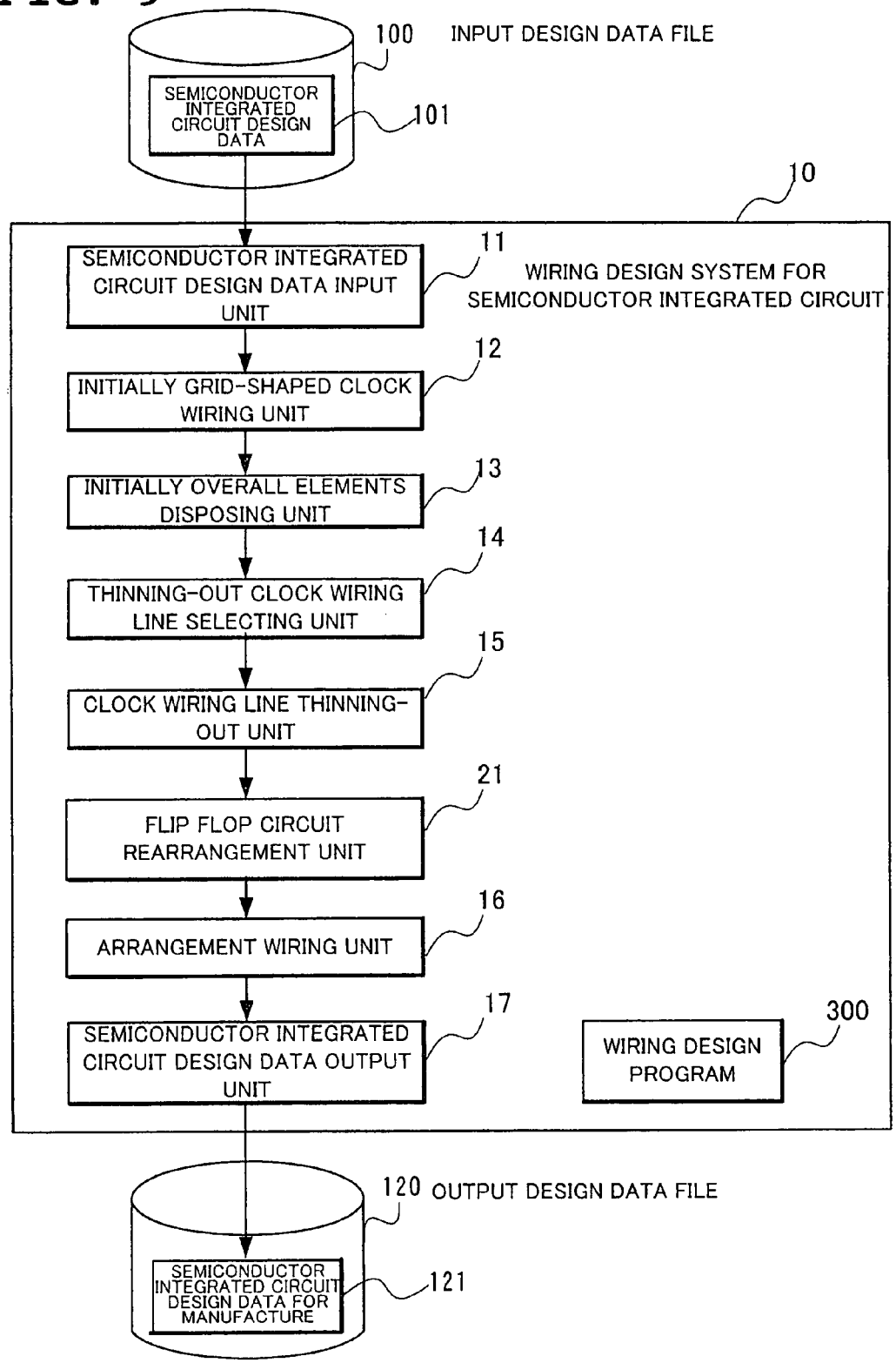
FIG. 9 is a view showing an example of rearrangement of a flip flop circuit according to the second exemplary embodiment of the invention.

FIG. 8 is a block diagram showing a structure of a wiring design system 20 for semiconductor integrated circuit according to the exemplary embodiment. In the following description, the important portion of FIG. 7 will be referred to.

In the wiring design system 20 for semiconductor integrated circuit according to the exemplary embodiment, a flip flop circuit rearrangement unit 21 is added to the wiring design system 10 for semiconductor integrated circuit according to the first exemplary embodiment of the invention.

The flip flop circuit rearrangement unit 21 makes the flip flop circuit 501 which becomes far from the clock wiring line 50 because the grid-shaped clock wiring is thinned out and eliminated according to the first exemplary embodiment, close to the clock wiring line 50 which is not thinned out nor eliminated, thereby restraining an increase of the clock skew caused by the thinning-out elimination of the grid-shaped clock wiring line.

Hereinafter, an operational example of the flip flop circuit rearrangement unit 21 will be described. Since the processing up to the processing performed by the clock wiring line thinning-out unit 15 of FIG. 8 is the same as that of the first exemplary embodiment of FIG. 1, the subsequent processing performed by the flip flop circuit rearrangement unit 21 will be described.

Referring to FIG. 7, since the flip flop circuit 502 is in the vicinity of the clock wiring line 50, there occurs no problem. However, since the target clock wiring line 60 for thinning out having existed in the vicinity of the flip flop circuit 501 is eliminated, the flip flop circuit 501 is connected to the clock wiring line 50 through the long clock signal line 80 and there occurs a clock skew. Hereinafter, a result of checking the clock skew by an experiment and a decrease of the clock skew according to the flip flop circuit rearrangement unit 21 will be described.

As shown in FIG. 3, the experiment for checking the clock skew generation in the case of thinning out one for every two clock wiring lines 50 is performed by using the same clock wiring line 50 as that described in FIG. 12 of the Background Art.

In the experiment, in the case of the design rule 90 nm of CMOSLSI (Complementary Metal Oxide Semiconductor Large Scale Integration), the clock skew between the flip flop circuit 501 in the vicinity of the target clock wiring line 60 for thinning out and the flip flop circuit 502 in the vicinity of the clock wiring line 50 which is not thinned out is compared between before and after thinning out of the clock wiring line 50. After the target clock wiring line 60 is thinned out, the arrangement wiring unit 16 wires the clock signal line 80 from the flip flop circuit 501 corresponding to the thinned clock wiring line 60 to the clock wiring line 50.

As the result, it is recognized that before the thinning out, the clock skew that is a difference of the arrival time of the clocks is 60 ps, while after the thinning out, it increases five times to 300 ps.

Next, in order to reduce the effect from the clock skew increase caused by thinning out of the clock wiring line 50, the flip flop circuit rearrangement unit 21 rearranges the flip flop circuit 501.

FIG. 8 is a view showing an example of the rearrangement of the flip flop circuit 501 according to the exemplary embodiment. The arrangement of the flip flops 501 and 502 before the rearrangement is as shown in FIG. 7.

Referring to FIG. 8, the flip flop circuit 501 in the vicinity of the target clock wiring line 60 for thinning out and the flip flop circuit 502 positioned in the vicinity of the clock wiring line 50 which is not thinned out are both arranged at the same distance from the clock wiring line 50.

In the flip flop circuit 502, there is no modification of the arrangement as the result of the rearrangement. The flip flop circuit 501, however, is rearranged at a position similarly distant from the clock wiring line 50 to the flip flop circuit 502.

In this way, the clock skew may be reduced by uniformizing the distance relation between the flip flop circuits 501 and 502 and the grid-shaped clock wiring line or by arranging the flip flop circuits 501 and 502 intensively in the vicinity of the grid-shaped clock wiring line.

Next, the effect of the flip flop rearrangement by the flip flop circuit rearrangement unit 21 on the clock skew reduction will be described.

In the experiment for checking the clock skew reduction through the flip flop rearrangement, by arranging the flip flop circuits 501 and 502 in the vicinity of the clock wiring line 50 as shown in FIG. 8, it is recognized that the clock skew of 60 ps before thinning out of the clock wiring line 50 can be recovered.

In this way, by performing the rearrangement of the flip flop circuit 501 after thinning out a less necessary clock wiring line, the clock skew can be reduced.

After the rearrangement of the flip flop circuit 501, the arrangement wiring unit 16 disposes and wires the elements of the semiconductor integrated circuit 40 according to the exemplary embodiment which is designed by using the wiring design system 20 for semiconductor integrated circuit so as to satisfy the design rule and the specification. Next, the semiconductor integrated circuit design data output unit 17 outputs the semiconductor integrated circuit design data 121 for manufacture to the output design data file 120.

In the above exemplary embodiment, the flip flop circuit 501 connected to the target clock wiring line 60 for thinning out through the clock signal line 80 in FIG. 7 is arranged in the vicinity of the clock wiring line 50 as shown in FIG. 8 after the rearrangement.

According to the arrangement and the restriction of the elements, however, there is a possibility that it cannot be arranged in the vicinity of the clock wiring line 50. As shown in FIG. 7, when the clock signal line 80 crosses the position of the target clock wiring line 60 for thinning out, the flip flop circuit 501 is rearranged at the position across the target clock wiring line 60 on the clock signal line 80. When the position is on the clock signal line 80, the circuit may be arranged at any position between the target clock wiring line 60 and the clock wiring line 50.

In the above exemplary embodiment, though the position of the flip flop circuit 502 connected to the clock wiring line 50 not thinned out is not changed, the flip flop circuit 502 may be arranged at a position closer to the clock wiring line 50 at the time of rearrangement of the flip flop circuit 501.

According to the exemplary embodiment, it is possible to reduce the power consumption in the clock wiring line 50 while keeping the clock skew small, by rearranging the flip flop circuit 501 after thinning out a less necessary clock wiring line.

This is because after thinning out the target clock wiring line 60, the flip flop circuit 501 connected to the clock wiring line 50 through the long clock signal line 80 is rearranged in the vicinity of the clock wiring line 50.

Third Exemplary Embodiment

Next, a third exemplary embodiment of the invention will be described by using the drawings.

Figure 10:
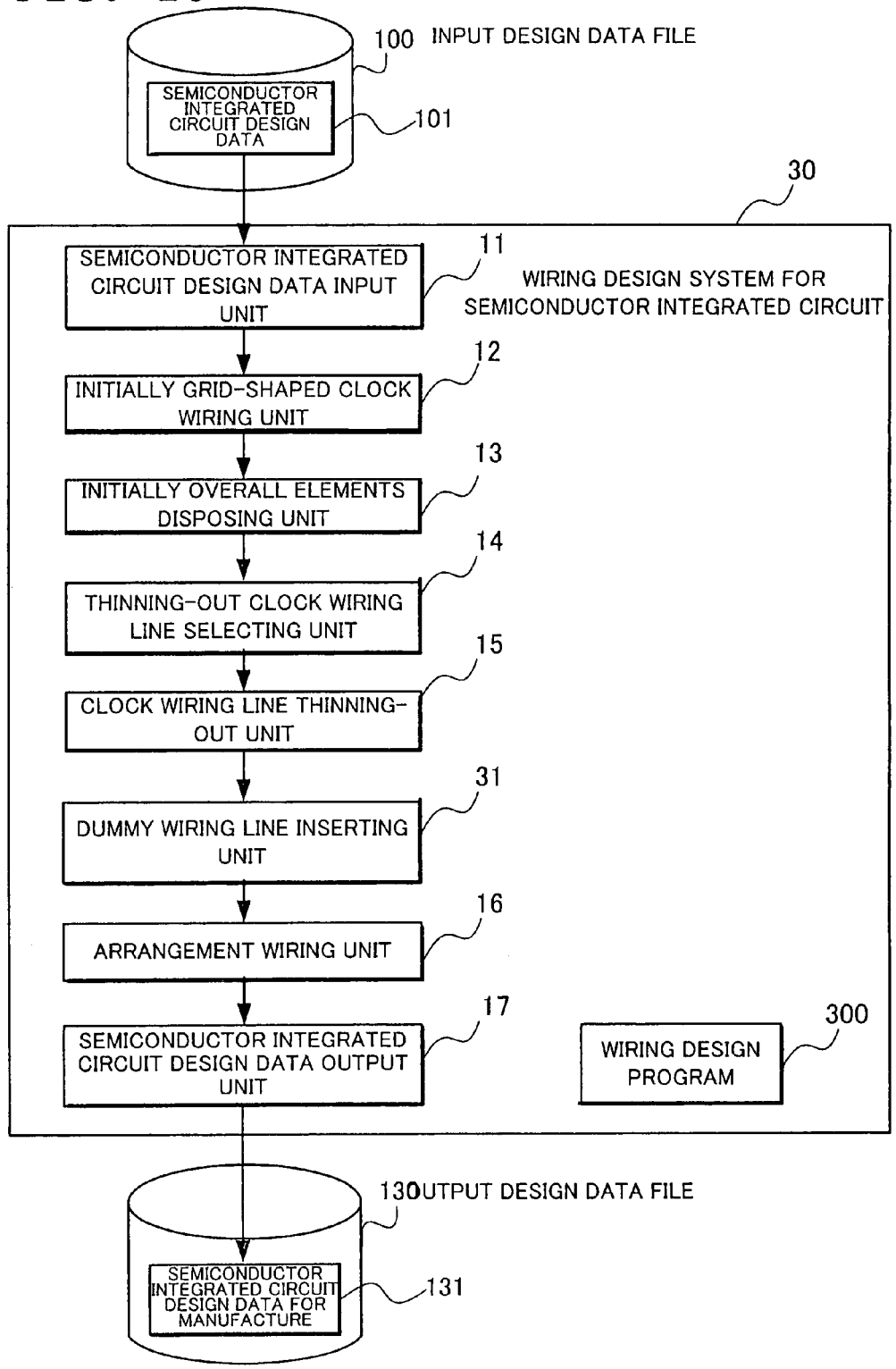
FIG. 10 is a block diagram showing a structure of a wiring design system for semiconductor integrated circuit according to a third exemplary embodiment of the invention.

FIG. 10 is a block diagram showing a structure of a wiring design system 30 for semiconductor integrated circuit according to the exemplary embodiment. In the following description, the important portions of FIG. 7 will be referred to.

In the wiring design system 30 for semiconductor integrated circuit, a dummy wiring line inserting unit 31 is added to the wiring design system 10 according to the first exemplary embodiment of the invention.

The dummy wiring line inserting unit 31 inserts a dummy wiring line in order to prevent the nonuniformity of the line capacity caused by the nonuniform thinning out of the clock wiring line 50 as shown in FIG. 4. In the dummy wiring line, signal does not travel, but since it is the same wiring line as the clock wiring line 50 completely, the distribution of the line capacity in the semiconductor integrated circuit 40 can be maintained uniformly in the same way as before thinning out of the clock wiring line 50.

In this way, the line capacity in the semiconductor integrated circuit 40 can be maintained and the signals can be analyzed and calculated easily in the same way as the ordinal grid-shaped clock wiring having the uniform capacity distribution.

The grid-shaped clock wiring in which the capacity distribution is uniform has an advantage that the calculation of the line capacity necessary for checking the effect of signal noise is easy. As described in FIG. 3 of the first exemplary embodiment, when the clock wiring lines 50 are thinned out uniformly, this advantage is not lost. However, when the wiring lines are thinned out nonuniformly as shown in FIG. 4, the advantage is lost and the dummy wiring line insertion according to the exemplary embodiment is necessary.

Hereinafter, an operation example of the dummy wiring line inserting unit 31 will be described. Since the processing up to the processing performed by the clock wiring line thinning-out unit 15 in FIG. 10 is the same as that in FIG. 1 according to the first exemplary embodiment, the subsequent processing by the dummy wiring line inserting unit 31 will be described.

Figure 11:
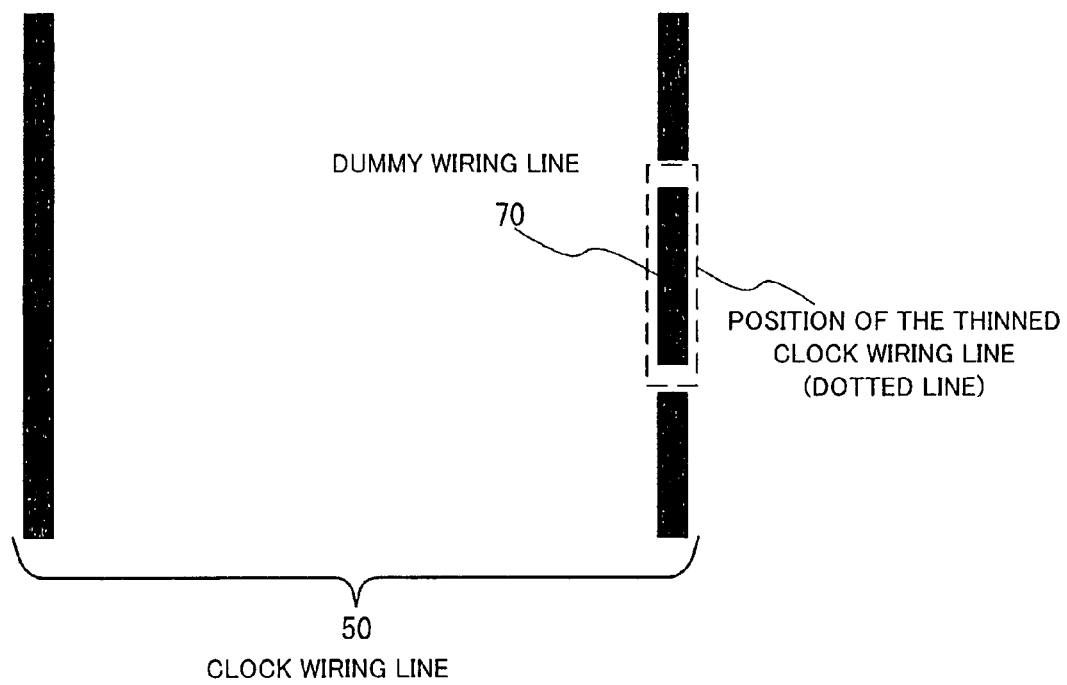
FIG. 11 is a view showing an example of dummy line insertion according to the third exemplary embodiment of the invention.

FIG. 11 is a view showing an example of the dummy wiring line insertion according to the exemplary embodiment.

Referring to FIG. 11, the dummy wiring line inserting unit 31 inserts a dummy wiring line 70 for securing the capacity in a position of the clock wiring line thinned out in a way of being electrically insulated from the clock wiring line 50 not thinned out. In this way, by inserting the dummy wiring line 70 in which signal does not travel, the uniformity of the capacity distribution in the semiconductor integrated circuit 40 is improved and the capacity calculation can be performed with ease remarkably.

After the dummy wiring line insertion, the arrangement wiring unit 16 disposes and wires the elements of the semiconductor integrated circuit 40 according to the exemplary embodiment which is designed by using the wiring design system 30 for semiconductor integrated circuit so as to satisfy the design rule and the specification. Next, the semiconductor integrated circuit design data output unit 17 outputs the semiconductor integrated circuit design data 131 for manufacture to the output design data file 130.

In the above exemplary embodiment, after the processing performed by the clock wiring line thinning-out unit 15, the dummy wiring line 70 is inserted by the dummy wiring line inserting unit 31. In this case, since the position of the flip flop 501 which receives the clock signal from the target clock wiring line 60 for thinning out is not changed, a clock skew is increased.

In order to reduce the clock skew, after the processing by the clock wiring line thinning-out unit 15, the flip flop circuit rearrangement unit 21 rearranges the flip flop circuit as having been described in the second exemplary embodiment of the invention. Next, the dummy wiring line 70 is inserted by the dummy wiring line inserting unit 31 as described in this exemplary embodiment. After the dummy wiring line 70 is inserted by the dummy wiring line inserting unit 31, the flip flop circuit may be rearranged.

After the insertion of the dummy wiring line 70, the arrangement wiring unit 16 disposes and wires the elements of the semiconductor integrated circuit 40 so as to satisfy the design rule and the specification. Next, the semiconductor integrated circuit design data output unit 17 outputs the semiconductor integrated circuit design data 131 for manufacture.

The above mentioned exemplary embodiment can prevent nonuniformity in the distribution of the line capacity within the semiconductor integrated circuit 40, caused by nonuniform thinning out of the clock wiring line 50.

That is because the dummy wiring line 70 for securing the capacity is inserted in a position of the target clock wiring line 60 for thinning out, in a way of being electrically insulated from the clock wiring line 50 not thinned out.

Each of the wiring design systems 10, 20, and 30 for semiconductor integrated circuit of the invention may realize its operation, needless to say, in a way of hardware. Further, a wiring design program (application) 300 for executing the above respective unit may be run by each of the wiring design systems 10, 20, and 30 for semiconductor integrated circuit that is a computer, in a way of software. The wiring design program 300 is stored in a recording medium such as a magnetic disk, a semiconductor memory, and the like, and loaded from the recording medium into each of the wiring design systems 10, 20, and 30 for semiconductor integrated circuit to control its operation, thereby realizing the above respective functions.

Although the invention has been described taking the preferred exemplary embodiments as mentioned above, the invention is not limited to the above mentioned exemplary embodiments but it may be modified variously within the scope of the technical spirit of the invention.

According to the invention, the power consumption in the grid-shaped clock wiring for semiconductor integrated circuit can be reduced.

That is because a less necessary clock wiring line is thinned out and eliminated from the grid-shaped clock wiring.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A wiring design system for semiconductor integrated circuit, comprising:
   means for designing a grid-shaped clock wiring for distributing clock signals to flip flop circuits arranged within the semiconductor integrated circuit, wherein
   a clock wiring line having a smaller effect on distribution operation of the clock signals in said grid-shaped clock wiring is thinned out from clock wiring lines forming said grid-shaped clock wiring.

2. The wiring design system for semiconductor integrated circuit according to claim 1, wherein
   said thinned out clock wiring line is selected based on, at least one of a number of the flip flop circuits supplying the clock signals through said clock wiring lines, a number of the flip flop circuits arranged in each grid forming the grid-shaped clock wiring, and a disposition of the flip flop circuits within the semiconductor integrated circuit.

3. The wiring design system for semiconductor integrated circuit according to claim 2, wherein
   the clock wiring lines are sequentially selected in order of increasing the number of said flip flop circuits supplying the clock signals and the number of the clock wiring lines corresponding to a fraction of all the clock wiring lines are thinned out.

4. The wiring design system for semiconductor integrated circuit according to claim 2, wherein
   the number of said flip flop circuits supplying the clock signals is calculated by every length of grid of the clock wiring lines forming said grid-shaped clock wiring, the clock wiring lines are sequentially selected in the order of increasing the number of said flip flop circuits, and the number of the clock wiring lines corresponding to a fraction of all said clock wiring lines are thinned out.

5. The wiring design system for semiconductor integrated circuit according to claim 2, wherein
   the number of said flip flop circuits arranged in the grid is calculated for every grid forming said grid-shaped clock wiring and the clock wiring line positioned on a boundary between a grid in which the number of said flip flop circuits is less than a predetermined number and a grid having the smallest number of the flip flop circuits, of grids adjacent to grid located above, is thinned out.

6. The wiring design system for semiconductor integrated circuit according to claim 2, wherein
   when the flip flop circuits are distributed uniformly, even numbers of the clock wiring lines from the clock wiring line positioned in an outer periphery of said grid-shaped clock wiring, are thinned out from said grid-shaped clock wiring formed by sets of two crossing clock wiring lines.

7. The wiring design system for semiconductor integrated circuit according to claim 1 or claim 2, wherein
   a clock signal line is generated which connects the flip flop circuit having been connected to said clock wiring line thinned out and eliminated to said clock wiring line not thinned out nor eliminated.

8. The wiring design system for semiconductor integrated circuit according to claim 7, wherein
   when said clock signal line is connected to said clock wiring line not eliminated across a region where there has been said eliminated clock wiring line, said flip flop circuit is rearranged at a position across said region on said clock signal line from said flip flop circuit.

9. The wiring design system for semiconductor integrated circuit according to claim 8, wherein
   the position across said region is near said clock wiring line not eliminated.

10. The wiring design system for semiconductor integrated circuit according to claim 8, wherein
    when rearranging said flip flop circuit, the flip flop circuit connected to said clock wiring line not eliminated is rearranged at a position closer to said clock wiring line.

11. The wiring design system for semiconductor integrated circuit according to claim 8, comprising
    a flip flop circuit rearrangement unit which rearranges said flip flop circuit.

12. The wiring design system for semiconductor integrated circuit according to claim 7, wherein
    a dummy wiring line electrically insulated from said clock wiring line not eliminated is generated in the region where there has been said eliminated clock wiring line.

13. The wiring design system for semiconductor integrated circuit according to claim 12, comprising
    a dummy wiring line inserting unit which generates a dummy wiring line electrically insulated from said clock wiring line not eliminated.

14. The wiring design system for semiconductor integrated circuit according to claim 2, wherein
    a portion of said clock wiring lines not thinned out nor eliminated which crosses said clock wiring line thinned out and eliminated, is not eliminated but left.

15. The wiring design system for semiconductor integrated circuit according to claim 1 or claim 2, comprising
    a thinning-out clock wiring line selecting unit which selects said clock wiring line having a smaller effect.

16. The wiring design system for semiconductor integrated circuit according to claim 2, comprising
    a clock wiring line thinning-out unit which thins out said clock wiring line.

17. A semiconductor integrated circuit including a grid-shaped clock wiring for supplying clock signals to flip flop circuits, comprising:
    clock wiring lines forming said grid-shaped clock wiring, wherein
    a portion of the clock wiring lines having a smaller effect on distribution operation of clock signals in said grid-shaped clock wiring is thinned out from the clock wiring lines, thereby reducing electric power consumption in said grid-shaped clock wiring, and
    the clock wiring lines are sequentially selected in the order of increasing a number of the flip flop circuits supplying said clock signals and a number of the clock wiring lines corresponding to a fraction of all the clock wiring lines are thinned out and eliminated.

18. A semiconductor integrated circuit including a grid-shaped clock wiring for supplying clock signals to flip flop circuits, comprising:
    clock wiring lines forming said grid-shaped clock wiring, wherein a clock wiring line having a smaller effect on distribution operation of clock signals in said grid-shaped clock wiring is thinned out from the clock wiring lines, thereby reducing electric power consumption in said grid-shaped clock wiring, a number of the flip flop circuits supplying said clock signals is calculated by every length of grid of the clock wiring lines forming said grid-shaped clock wiring, the clock wiring lines are sequentially selected in the order of increasing the number of said flip flop circuits, and a number of the clock wiring lines corresponding to a fraction of all said clock wiring lines are thinned out and eliminated.

19. A semiconductor integrated circuit including a grid-shaped clock wiring for supplying clock signals to flip flop circuits, comprising clock wiring lines forming said grid-shaped clock wiring, wherein a clock wiring line having a smaller effect on distribution operation of clock signals in said grid-shaped clock wiring is thinned out from the clock wiring lines, thereby reducing electric power consumption in said grid-shaped clock wiring, a number of the flip flop circuits arranged in each grid forming said grid-shaped clock wiring line is calculated for every grid generated by said grid-shaped clock wiring and the clock wiring line positioned on a boundary between a grid in which the number of said flip flop circuits is less than a predetermined number and a grid having the smallest number of the flip flop circuits, of grids adjacent to grid located above, is thinned out and eliminated.

20. The semiconductor integrated circuit according to any one of claim 17 to claim 19, wherein a dummy wiring line electrically insulated from said clock wiring line not thinned out nor eliminated is arranged in a region where there has been said clock wiring line thinned out and eliminated.

21. A computer readable storage device comprising a wiring design program for designing a grid-shaped clock wiring of distributing clock signals to flip flop circuits arranged within a semiconductor integrated circuit, which when executed on a computer, causes the computer to perform the functions of:

thinning out a clock wiring line having a smaller effect on distribution operation of clock signals in said grid-shaped clock wiring, of the clock wiring lines forming said grid-shaped clock wiring included in design data.

22. The computer readable storage device according to claim 21, further comprising selecting said clock wiring line having a smaller effect, based on, at least one of a number of the flip flop circuits supplying the clock signals through the clock wiring lines, a number of the flip flop circuits arranged in each grid forming the grid-shaped clock wiring, and a disposition of the flip flop circuits within the semiconductor integrated circuit.

23. The computer readable storage device according to claim 22, further comprising sequentially selecting the clock wiring lines in the order of increasing the number of said flip flop circuits supplying the clock signals and thinning out the number of the clock wiring lines corresponding to a fraction of all the clock wiring lines.

24. The computer readable storage device according to claim 22, further comprising calculating the number of said flip flop circuits supplying the clock signals by every length of grid of the clock wiring lines forming said grid-shaped clock wiring, sequentially selecting the clock wiring lines in the order of increasing the number of said flip flop circuits, and thinning out the number of the clock wiring lines corresponding to a fraction of all said clock wiring lines.

25. The computer readable storage device according to claim 22, further comprising calculating the number of said flip flop circuits arranged in the grid for every grid forming said grid-shaped clock wiring and thinning out the clock wiring line positioned on a boundary between a grid in which the number of said flip flop circuits is less than a predetermined number and a grid having the smallest number of the flip flop circuits, of grids adjacent to grid located above.

26. The computer readable storage device according to claim 22, further comprising thinning out even numbers of the clock wiring lines from the clock wiring line positioned in an outer periphery of said grid-shaped clock wiring, from said grid-shaped clock wiring formed by sets of two crossing clock wiring lines, when said flip flop circuits are distributed uniformly.

27. The computer readable storage device according to claim 21 or claim 22, further comprising generating a clock signal line which connects the flip flop circuit having been connected to said clock wiring line thinned out and eliminated to said clock wiring line not thinned out nor eliminated.

28. The computer readable storage device according to claim 27, further comprising rearranging said flip flop circuit at a position across a region where there has been said eliminated clock wiring line, on said clock signal line from said flip flop circuit, when said clock signal line is connected to said clock wiring line not eliminated across said region.

29. The computer readable storage device according to claim 27, further comprising generating a dummy wiring line electrically insulated from said clock wiring line not eliminated in the region where there has been said eliminated clock wiring line.

30. The computer readable storage device according to claim 21 or claim 22, further comprising not eliminating but leaving a portion of said clock wiring lines not thinned out nor eliminated, which crosses said clock wiring line thinned out and eliminated.

* * * * *